United States Patent
Haussels

[15] 3,695,728
[45] Oct. 3, 1972

[54] DOUBLE-DISK VEHICLE WHEEL

[72] Inventor: Berthold Haussels, Tente/Rhineland, Germany

[73] Assignee: Happe & Co., Tonisheide, Germany

[22] Filed: April 27, 1970

[21] Appl. No.: 32,208

[30] Foreign Application Priority Data

April 29, 1969 Germany..........P 19 21 736.8

[52] U.S. Cl. ..........301/63 DD, 301/63 PW, 152/402
[51] Int. Cl. ..............................................B60b 5/02
[58] Field of Search............301/63 PW, 63 D, 63 DS

[56] References Cited

UNITED STATES PATENTS

| 1,989,189 | 1/1935 | Frank | 301/63 DS |
| 789,995 | 5/1905 | McCan | 301/63 DS |
| 1,497,725 | 6/1924 | Hummel | 301/35 BJ X |
| 2,606,076 | 8/1952 | Frazer | 301/63 PW |
| 3,048,447 | 8/1962 | Klint | 301/63 PW |

FOREIGN PATENTS OR APPLICATIONS

| 628,786 | 10/1961 | Canada | 301/63 PW |

Primary Examiner—Richard J. Johnson
Attorney—Karl F. Ross

[57] ABSTRACT

A double-disk vehicle wheel whose synthetic-resin wheel disks are centered upon a common axis and are mutually juxtaposed to define a tire seat along the outer peripheries of the disks. An annular tire is mounted upon the tire seat, and an axially extending barb, connected with one of the disks and a recess formed in the other disk for receiving the barb define a resiliently deformable snap coupling joining the disks together.

4 Claims, 9 Drawing Figures

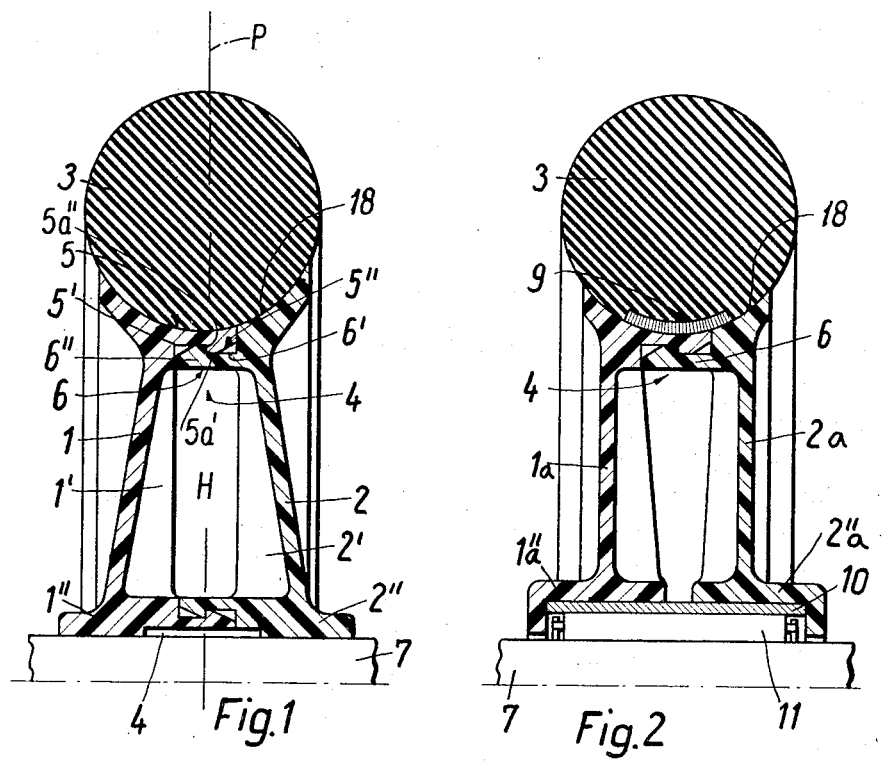
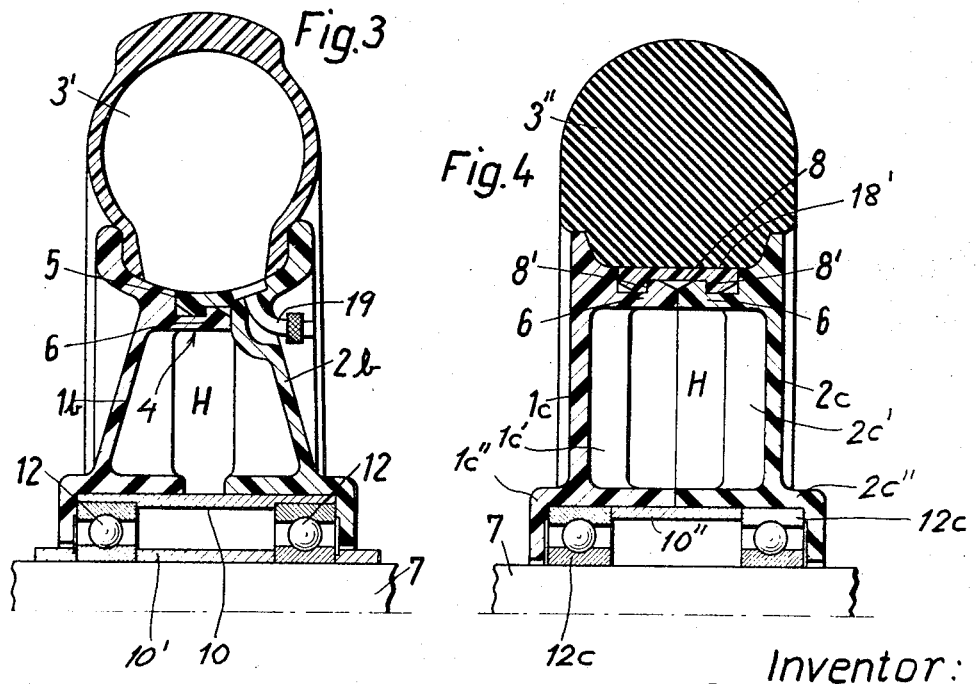

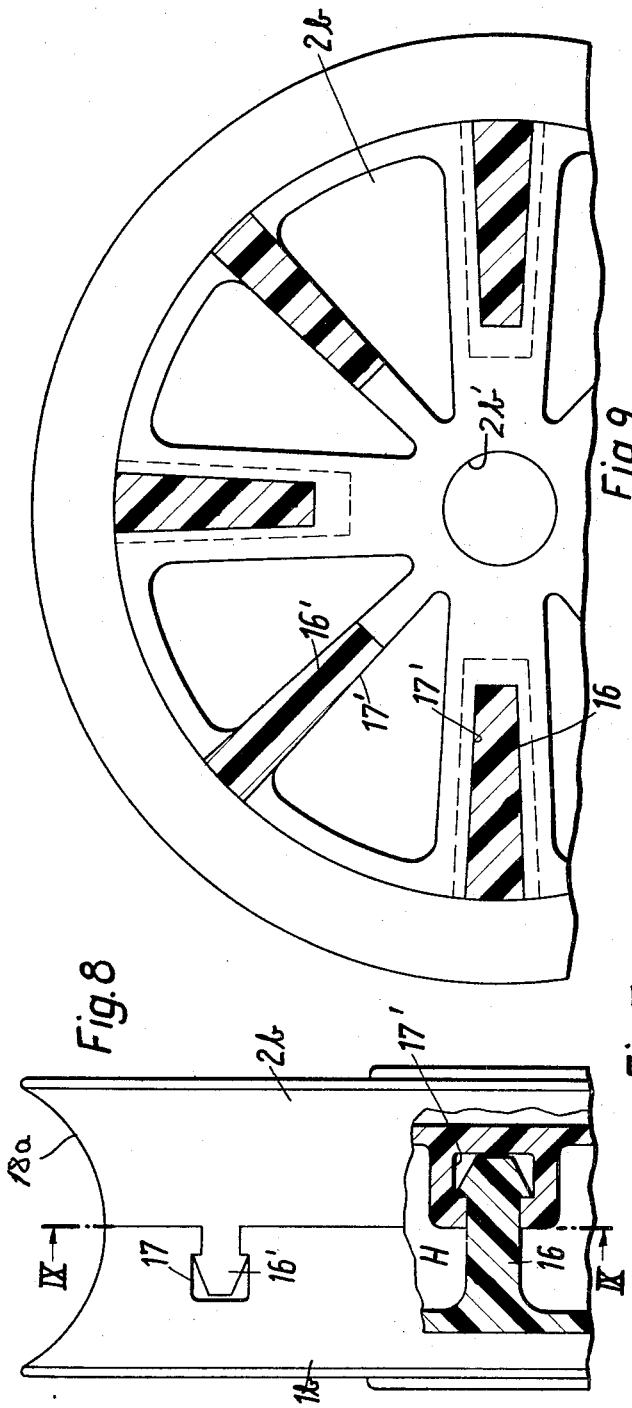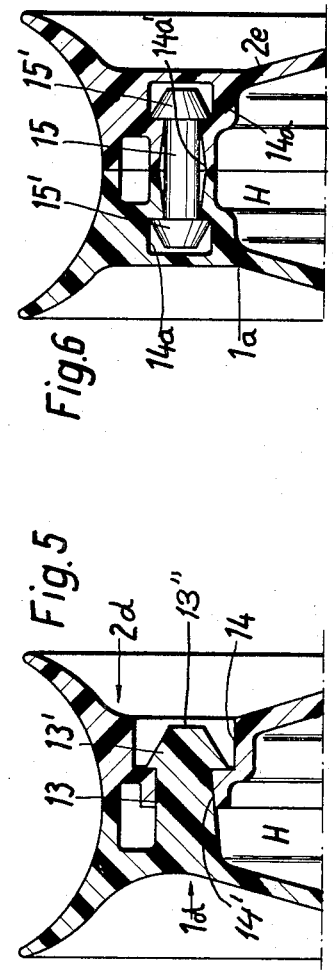

DOUBLE-DISK VEHICLE WHEEL

FIELD OF THE INVENTION SPECIFICATION

The present invention relates to a vehicle wheel having a pair of synthetic-resin wheel disks or a so-called "double-disk" wheel.

BACKGROUND OF THE INVENTION

Generally such wheels have an annular hollow space between the hub and rim portions of the two disks. Such wheels have great strength as compared with a wheel of similar dimensions having a single wheel disk. The double-disk construction also makes it easy to protect any bearings mounted in the hub.

Wheels of this type are generally bolted or riveted together. To this end they are formed with matching sets of holes, and the connecting together of two disks by bolts or rivets through the holes becomes a time-consuming operation. Furthermore, when metallic bolts or rivets are used the disks are corrodible, relatively heavy, etc. These connectors are usually arranged in the hub area of the wheel and the large axial stresses which act on the wheel often suffice to break the two disks apart.

OBJECTS OF THE INVENTION

It is, therefore, an object of the present invention to provide an improved wheel of the double-disk type.

Another object to provide a double-disk wheel whose assembly is simple, which is very strong, which is inexpensive and which is of light weight.

The above objects are attained in accordance with the present invention by a wheel having snap-coupling means for holding the disks together. This means includes a projection formed with a barb on one of the disks and a recess in the other disk, the barb catching in the recess to retain the two together.

SUMMARY OF THE INVENTION

According to a feature of this invention the barb is formed on an annular flange with generatrices parallel to the axis on the one disk while the recess is formed on a mating annular flange on the other disk. These flanges are at the outer edge of the disks, near the rim, so that the disks are connected together at the region where most breaking stresses are exerted.

Another feature of this invention is the provision of a plurality of angularly equispaced projections formed with barbs and receivable in recesses on the opposite disk. Each projection can be simply a pin with a head having a frustoconical surface, or can be a radially elongated projection with an enlarged, somewhat pointed head. In both cases the recess is formed to correspond to the shape of the projection, and has a narrow neck behind which the head is adapted to catch.

A wheel according to this invention is assembled by merely placing the two disks next to each other and pressing them axially together to snap them together.

According to yet another feature of the invention a coupling element formed with a a pair of barbs engageable with each disk is provided, this element serving one case in the form of a ring as a tire seat so that uncoupling of the two disks is virtually impossible. In addition the two disks overlap each other axially so that the tendency a wheel has to break or shear directly across its center is counteracted by the wheel according to this invention since there is no division between the disks along this plane through the wheel, as in prior-art double-disk wheels.

DESCRIPTION OF THE DRAWING

The above and other objects, features, and advantages will become apparent from the following description, reference being made to the accompanying drawing, in which:

FIGS. 1 – 6 are cross sections through wheels according to the present invention;

FIG. 7 is a side view of the wheel shown in FIG. 5;

FIG. 8 is an elevational view, partly in section, of yet another embodiment of the present invention; and FIG. 9 is a section taken along line IX—IX of FIG. 8.

SPECIFIC DESCRIPTION

As shown in FIG. 1, a wheel comprises two disks 1 and 2 with respective hub portions 1'', 2'' and rim portions defining a rim 18 in which a tire 3 of circular cross section is mounted. A shaft 7 passes axially through the hub 1'', 2'' of the wheel.

Adjacent the rim 18 the synthetic-resin disk 1 is formed with an axially extending flange 5 having a barbed portion 5'' and a region 5' of reduced cross section. The disk 2 is formed with a similar flange 6 having a barbed portion 6'' and a narrow portion 6'. The two together form a snap coupling 4 which firmly attaches the two disks together adjacent this rim 18. A similar snap coupling 4' is provided adjacent the hub 1'', 2''.

The formations 5' and 5'' have flanks $5a'$ and $5a''$ which lie in a plane P perpendicular to the axis of the wheel to bear on one another with axial force developed when the tire 3 is compressed by loading.

Between the disks 1 and 2 there is a hollow space H in which are stiffening ribs 1' and 2' which prevent deformation of the wheel in use.

The embodiment of FIG. 2 has the same reference numerals as FIG. 1, wherever applicable. Here, however, wheel disks 1a and 2a extend substantially normally to the axis of shaft 7, not inwardly inclined away from the hub as in FIG. 1.

The wheel of FIG. 2 has a flat metal ring 9 of U-shaped cross section which serves as a seat for the tire 3. Two wheel disks 1a and 2a have hub portions 1a'' and 2a'' which are not directly connected together, but which ride via a cylindrical metal ring 10 on rollers 11 that allow the wheel to turn freely on the shaft 7.

In FIG. 3 a pneumatic tire 3' is shown mounted on a pair of substantially frustoconical disks 1b and 2b, with its stem 19 passing on through the disk 2b. The two disks 1b and 2b are joined together adjacent the tire 3' by a snap coupling 4 as in FIGS. 1 and 2, and ride on a cylindrical ring 10 adjacent the shaft 7. A pair of ball bearings 12 are provided with one race against the ring 10 and another between rings 10' on the shaft 7.

It can be seen that in FIGS. 1– 3 the disks overlap directly adjacent the tire. Due to this construction the wheel is extremely strong at its outer edge so that axial stresses exerted on the tire are not likely to separate the disks at their outer peripheries, at the tire seat.

The wheel of FIG. 4 has a pair of disks 1c and 2c with stiffening webs 1c' and 2c' and each formed with a respective annular barbed projection 6 as in FIG. 1.

Each disk 1c and 2c is flat and the two projections 6 are joined together by a cylindrical ring 8 formed with a pair of barbed edges 8' that engage over the barbs 6. A tire 3" is provided which has a flat inner periphery that fits against the seat 18' formed by the ring 8. The disks 1c and 2c have inner-periphery flange portions 1c" and 2c" which abut each other at their facing edges and straddle a pair of ball bearings 12c separated by a cylindrical sleeve 10" and riding on the shaft 7.

In FIGS. 5 and 7 there is shown a pair of wheel disks 1d and 2d which are interconnected by a plurality of pinlike projections 13 formed with enlarged heads 13' each having a frustoconical surface. A hole 14 formed in the disk opposite the projection has a flared neck 14' of larger diameter than the top 13" of the pin 13 so that this latter can be forced therethrough to lock the two disks together. The projections 13 and recesses 14 are alternately spaced around the disks 1d and 2d so that identical disks can be coupled together, thereby eliminating the need for two molds for their manufacture.

The embodiment of FIG. 6 corresponds substantially to that of FIGS. 5 and 7, except that the disks 1e and 2e are each formed with a blind recess 14a into which is engaged one of the two heads 15' of a coupling element 15. The bores 14a' are flared slightly outwardly in toward each other to facilitate assembly of the wheel.

In FIGS. 8 and 9 a pair of similar wheel disks 1f and 2f are each formed with radially extending bladelike projections 16 having broad tapered heads 16' axially received in slots 17' in the opposite disk. Each projection extends from the tire seat 18a inwardly at least halfway to the wheel hub 2f. In addition both the projections 16 and slots 17' are tapered inwardly toward the hub, so that they prevent shifting of one disk relative to the other in any direction. Both the projections 16 and recesses 17' are formed on spokelike portions of the wheel.

In all embodiments the two synthetic-resin disks are attached together by a snap one-way coupling at or immediately adjacent to the tire seat so that the chance that they separate this region is very small.

We claim:

1. A vehicle wheel comprising:

1 a pair of synthetic-resin wheel disks centered upon a common axis and mutually juxtaposed to define a tire seat along the outer peripheries of said disks;

1 an annular tire mounted upon said tire seat;

1 an axially extending flange connected with one said disks and underlying said tire and provided with an inwardly-extending ridge; and 1 an annular recess formed in the other disk for receiving said flange, said recess and said flange defining a resiliently deformable snap coupling joining said disks together upon relative axial displacement of said disks toward one another and being formed along said ridge and a confronting portion of the wall of said recess with mutually abutting annular flanks lying in a plane perpendicular to the axis of said disks, said flanks preventing axial separation of said disks.

2. The vehicle wheel defined in claim 1 wherein said recess and flange overlap axially along said outer portion of said disk.

3. The vehicle wheel defined in claim 1 wherein said disks are provided with respective hub portions surrounding said axis, said recess and said flange being provided at said hub portions.

4 The vehicle wheel defined in claim 1 wherein said disks further comprise a hub portion proximal to said axis and an outer portion carrying said tire, a respective such snap coupling being provided in each of said portions.

* * * * *